US012561409B2

(12) United States Patent
Bhunia et al.

(10) Patent No.: US 12,561,409 B2
(45) Date of Patent: Feb. 24, 2026

(54) MULTI-LAYERED FRAMEWORK FOR SECURITY OF INTEGRATED CIRCUITS

(71) Applicant: University of Florida Research Foundation, Incorporated, Gainesville, FL (US)

(72) Inventors: Swarup Bhunia, Gainesville, FL (US); Aritra Dasgupta, Gainesville, FL (US); Reiner Dizon, Gainesville, FL (US); Aritra Bhattacharyay, Gainesville, FL (US); Rasheed Almawzan, Gainesville, FL (US)

(73) Assignee: UNIVERSITY OF FLORIDA RESEARCH FOUNDATION, INCORPORATED, Gainesville, FL (US)

( * ) Notice: Subject to any disclaimer, the term of this patent is extended or adjusted under 35 U.S.C. 154(b) by 264 days.

(21) Appl. No.: 18/327,342

(22) Filed: Jun. 1, 2023

(65) Prior Publication Data

US 2023/0394122 A1     Dec. 7, 2023

Related U.S. Application Data

(60) Provisional application No. 63/348,184, filed on Jun. 2, 2022.

(51) Int. Cl.
*H04L 29/00*     (2006.01)
*G06F 21/14*     (2013.01)
*G06F 21/57*     (2013.01)

(52) U.S. Cl.
CPC ............ *G06F 21/14* (2013.01); *G06F 21/577* (2013.01); *G06F 2221/033* (2013.01)

(58) Field of Classification Search
CPC .. G06F 21/14; G06F 21/577; G06F 2221/033; G06F 21/76
See application file for complete search history.

(56) References Cited

U.S. PATENT DOCUMENTS

| | | | | |
|---|---|---|---|---|
| 2002/0062198 A1* | 5/2002 | Dawson | ............... | G01R 21/133 |
| | | | | 702/62 |
| 2011/0113392 A1* | 5/2011 | Chakraborty | ............ | G09C 1/00 |
| | | | | 716/102 |
| 2020/0394340 A1* | 12/2020 | Wu | ........................ | G06F 21/568 |
| 2023/0116607 A1* | 4/2023 | Talukdar | ............... | G11C 29/36 |
| | | | | 726/34 |

* cited by examiner

*Primary Examiner* — Ghazal B Shehni
(74) *Attorney, Agent, or Firm* — Alston & Bird LLP

(57)     ABSTRACT

Various embodiments of the present disclosure provide a multi-layered framework for security of integrated circuits. In one example, an embodiment provides for removing one or more routing tables in a Register Transfer Level (RTL) source code that models a design for an SoC via a hardware description language, comprising replacing the one or more routing tables in the RTL source code with respective programmable memory, transforming a state space of one or more embedded state machines in the RTL source code, transforming one or more portions of combinational logic in the RTL source code, and/or removing one or more portions of security-critical logic in the RTL source code, comprising replacing the one or more portions of security-critical logic in the RTL source code with respective lookup tables.

20 Claims, 10 Drawing Sheets

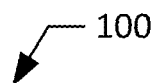
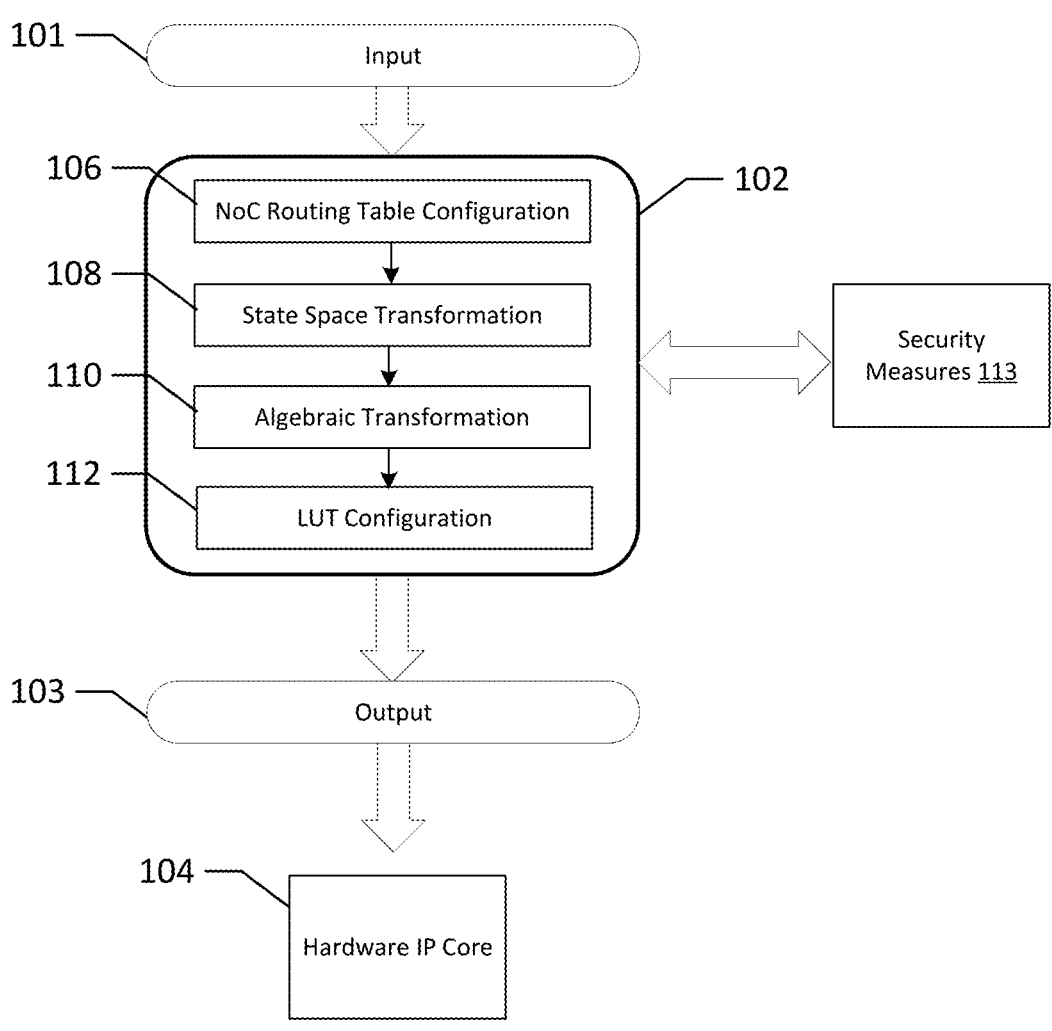
FIG. 1

200
106
NoC Routing Table Configuration
Removal & Replacement
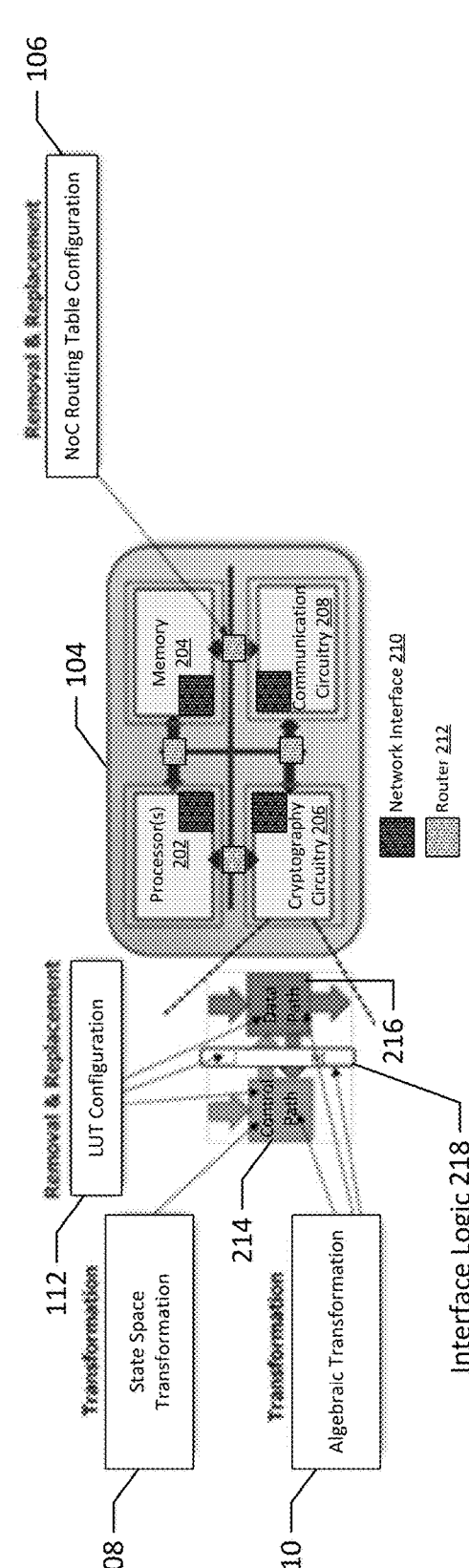
104
Memory 204
Communication Circuitry 208
Processor(s) 202
Cryptography Circuitry 206
Network Interface 210
Network Interface 212
Router 212
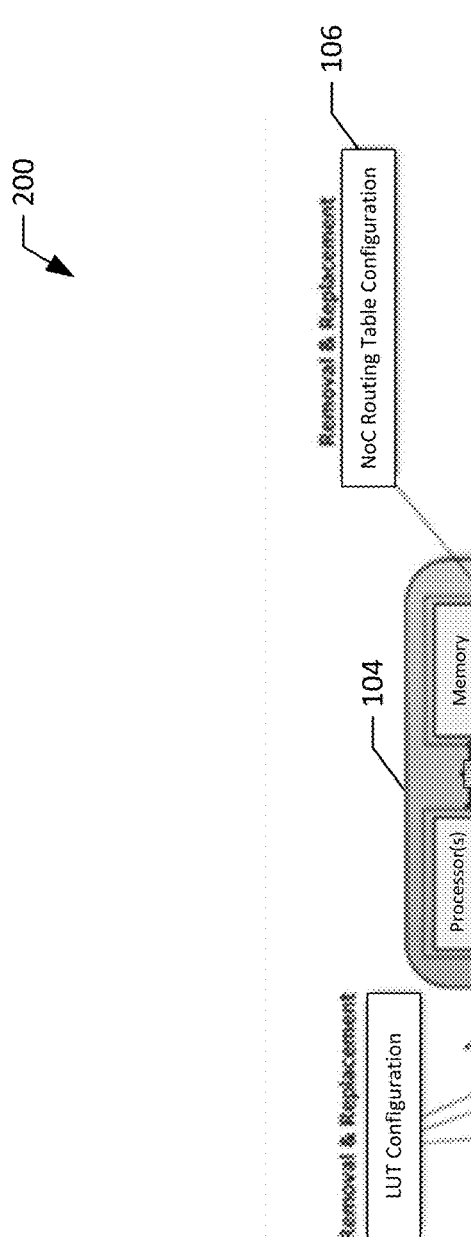
112
LUT Configuration
Removal & Replacement
Control Unit
214
216
Interface Logic 218
108
State Space Transformation
Transformation
110
Algebraic Transformation
Transformation
FIG. 2

601 — Configuration File Tech Libraries SDC File

603 — Input Design (RTL or Netlist)

SST

602 — Initial synthesis

604 — Generate hypergraph in CAST framework

606 — Identify state elements (FFs) in the design

608 — Create Obfuscation FSMs to validate key

610 — Merge OFSMs with the original design

612 — Final constrained synthesis

607 — Transformed Design

605 — SST Key

701 — Configuration File
Tech Libraries
SDC File

703 — Input Design
(RTL or Netlist)

BAT

702 — Initial synthesis

704 — Generate hypergraph in
CAST framework

706 — Determine critical and
non-critical logic cones

708 — Strip functionality of a
non-critical logic cone

710 — Partition hypergraph

712 — Truth Table Transformation

714 — Final constrained synthesis

707 — Transformed Design

705 — BAT Key

800

801 — Configuration File
Tech Libraries
SDC File

803 — Input Design
(RTL or Netlist)

LUTC

802 — Initial synthesis

804 — Generate hypergraph in
CAST framework

806 — Identify structural signatures
or critical logic

808 — Replace candidate logic blocks
with programmable LUTs

810 — Final constrained synthesis

807 — Transformed Design

805 — LUTC
Bitstream

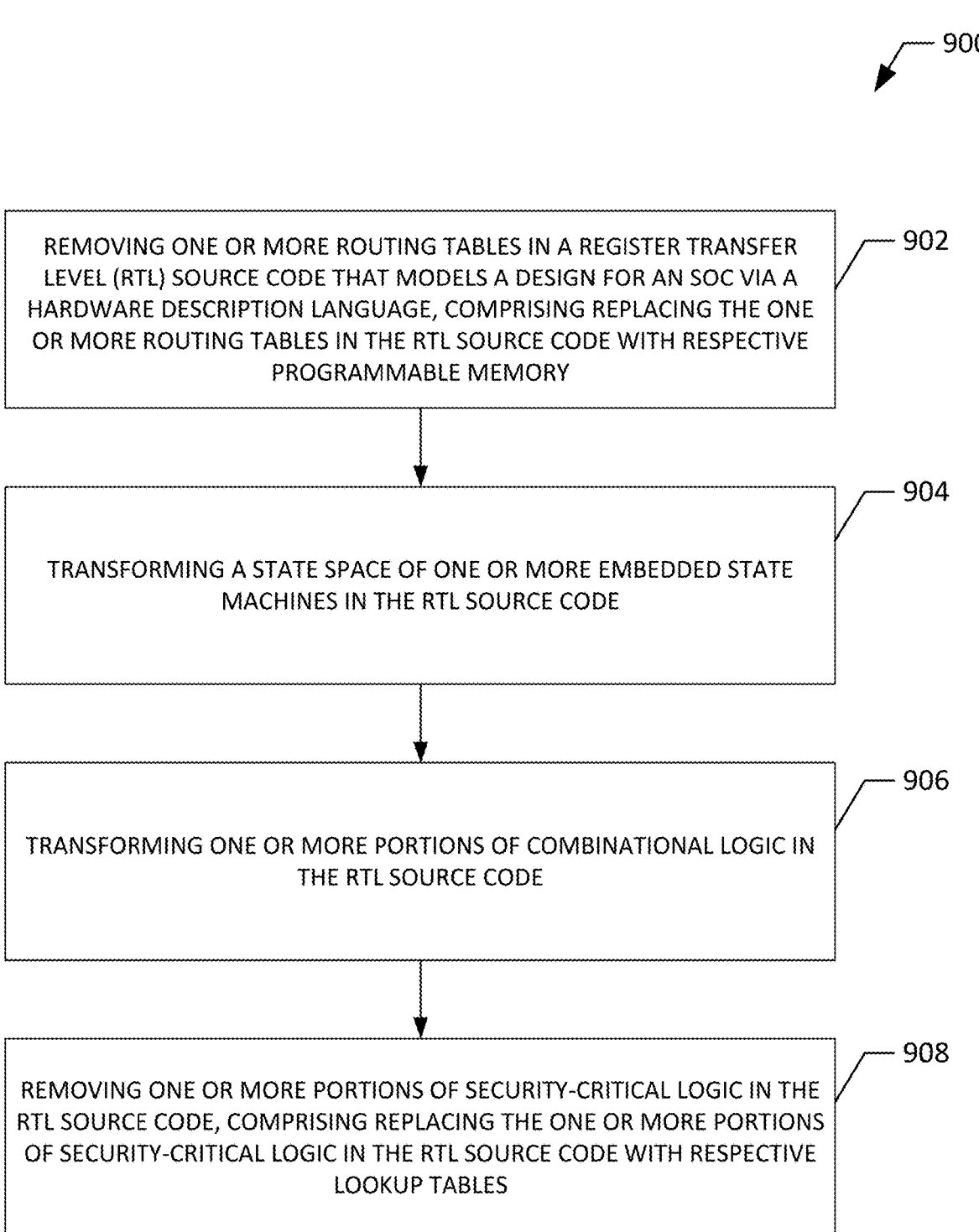

900

REMOVING ONE OR MORE ROUTING TABLES IN A REGISTER TRANSFER LEVEL (RTL) SOURCE CODE THAT MODELS A DESIGN FOR AN SOC VIA A HARDWARE DESCRIPTION LANGUAGE, COMPRISING REPLACING THE ONE OR MORE ROUTING TABLES IN THE RTL SOURCE CODE WITH RESPECTIVE PROGRAMMABLE MEMORY — 902

TRANSFORMING A STATE SPACE OF ONE OR MORE EMBEDDED STATE MACHINES IN THE RTL SOURCE CODE — 904

TRANSFORMING ONE OR MORE PORTIONS OF COMBINATIONAL LOGIC IN THE RTL SOURCE CODE — 906

REMOVING ONE OR MORE PORTIONS OF SECURITY-CRITICAL LOGIC IN THE RTL SOURCE CODE, COMPRISING REPLACING THE ONE OR MORE PORTIONS OF SECURITY-CRITICAL LOGIC IN THE RTL SOURCE CODE WITH RESPECTIVE LOOKUP TABLES — 908

FIG. 9

MULTI-LAYERED FRAMEWORK FOR SECURITY OF INTEGRATED CIRCUITS

CROSS REFERENCE TO RELATED APPLICATIONS

This application claims priority to U.S. Appl. No. 63/348,184 filed Jun. 2, 2022, the contents of which are incorporated herein in its entirety by reference.

GOVERNMENT SUPPORT

This invention was made with government support under HR0011-21-3-0001 awarded by US DEPARTMENT OF DEFENSE DARPA. The government has certain rights in the invention.

TECHNICAL FIELD

The present application relates to the technical field of integrated circuits. In particular, the invention relates to security associated with integrated circuits.

BACKGROUND

The increasing demand of the hardware electronics has caused a shift in development, fabrication, and assembly of hardware electronics. For example, a company today often handles only a certain stage of development, fabrication, and/or assembly of hardware electronics while one or more other stages are outsourced to another company. However, this shift has given rise to untrusted third-party entities (e.g., an untrusted foundry) where hardware electronics such as, for example, hardware Intellectual Property (IP) cores, are fabricated with designers of the hardware electronics not fully knowing details regarding the fabrication process. In such fabrication scenarios for hardware electronics, oracle-guided attacks are possible where an untrusted third-party entity has access to an unlocked design of a hardware electronic to perform attacks such as, for example, brute-force or Boolean satisfiability (SAT) attacks. In addition, structural-based attacks and removal-based attacks can take advantage of access to a netlist of a locked design of a hardware electronic to determine added components with respect to an original design of the hardware electronic. As such, an untrusted third-party entity can potentially remove these added components in order to gain full or partial functionality of the hardware electronic. As such, these attacks affect the confidentiality of information running through the hardware electronics and/or the integrity in terms of the functionality of the hardware electronics.

SUMMARY

In general, embodiments of the present invention provide methods, apparatus, systems, computing devices, computing entities, and/or the like for providing a multi-layered framework for security of integrated circuits. The details of some embodiments of the subject matter described in this specification are set forth in the accompanying drawings and the description below. Other features, aspects, and advantages of the subject matter will become apparent from the description, the drawings, and the claims.

In an embodiment, a method for providing a multi-layered framework for security of integrated circuits is provided. The method provides for providing an attack-resistant obfuscated SoC based on a transformed RTL source code by:

removing one or more routing tables in a Register Transfer Level (RTL) source code that models a design for an SoC via a hardware description language, comprising replacing the one or more routing tables in the RTL source code with respective programmable memory, transforming a state space of one or more embedded state machines in the RTL source code, transforming one or more portions of combinational logic in the RTL source code, and/or removing one or more portions of security-critical logic in the RTL source code, comprising replacing the one or more portions of security-critical logic in the RTL source code with respective lookup tables.

In another embodiment, an apparatus for providing a multi-layered framework for security of integrated circuits is provided. The apparatus comprises at least one processor and at least one memory including program code. The at least one memory and the program code is configured to, with the at least one processor, cause the apparatus to remove one or more routing tables in RTL source code that models a design for an SoC via a hardware description language, comprising replacing the one or more routing tables in the RTL source code with respective programmable memory, transform a state space of one or more embedded state machines in the RTL source code, transform one or more portions of combinational logic in the RTL source code, and/or remove one or more portions of security-critical logic in the RTL source code, comprising replacing the one or more portions of security-critical logic in the RTL source code with respective lookup tables.

In yet another embodiment, a non-transitory computer storage medium comprising instructions for providing a multi-layered framework for security of integrated circuits is provided. The instructions are configured to cause one or more processors to at least perform operations configured to remove one or more routing tables in RTL source code that models a design for an SoC via a hardware description language, comprising replacing the one or more routing tables in the RTL source code with respective programmable memory, transform a state space of one or more embedded state machines in the RTL source code, transform one or more portions of combinational logic in the RTL source code, and/or remove one or more portions of security-critical logic in the RTL source code, comprising replacing the one or more portions of security-critical logic in the RTL source code with respective lookup tables.

BRIEF DESCRIPTION OF THE DRAWINGS

Reference will now be made to the accompanying drawings, which are not necessarily drawn to scale, and wherein:

FIG. 1 illustrates an exemplary hardware design process, according to one or more embodiments of the present disclosure;

FIG. 2 illustrates an exemplary system associated with security countermeasures, according to one or more embodiments of the present disclosure;

FIG. 9 illustrates a flowchart of a method for providing a multi-layered framework for security of integrated circuits according to one or more embodiments of the present disclosure.

DETAILED DESCRIPTION

Figure 3:
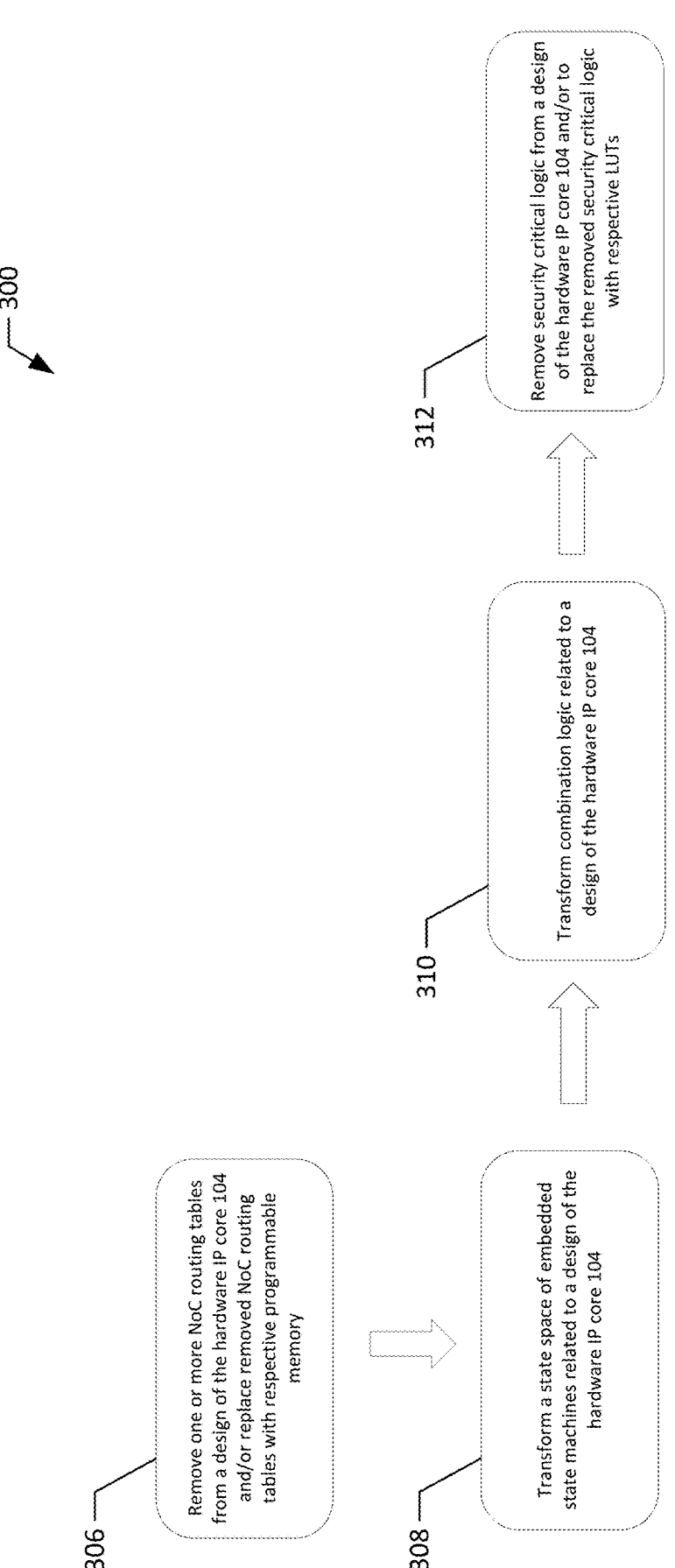
FIG. 3 illustrates an exemplary transformation process, according to one or more embodiments of the present disclosure.

The present disclosure more fully describes various embodiments with reference to the accompanying drawings. It should be understood that some, but not all, embodiments are shown and described herein. Indeed, the embodiments may take many different forms, and accordingly, this disclosure should not be construed as limited to the embodiments set forth herein. Rather, these embodiments are provided so that this disclosure will satisfy applicable legal requirements. Like numbers refer to like elements throughout.

As discussed above, the increasing demand of the hardware electronics has caused a shift in development, fabrication, and assembly of hardware electronics. For example, a company today often handles only a certain stage of development, fabrication, and/or assembly of hardware electronics while one or more other stages are outsourced to another company. However, this shift has given rise to untrusted third-party entities (e.g., an untrusted foundry) where hardware electronics such as, for example, hardware Intellectual Property (IP) cores, are fabricated with designers of the hardware electronics not fully knowing details regarding the fabrication process. In such fabrication scenarios for hardware electronics, oracle-guided attacks are possible where an untrusted third-party entity has access to an unlocked design of a hardware electronic to perform attacks such as, for example, brute-force or Boolean satisfiability (SAT) attacks. In addition, structural-based attacks and removal-based attacks can take advantage of access to a netlist of a locked design of a hardware electronic to determine added components with respect to an original design of the hardware electronic. As such, an untrusted third-party entity can potentially remove these added components in order to gain full or partial functionality of the hardware electronic. As such, these attacks affect the confidentiality of information running through the hardware electronics and/or the integrity in terms of the functionality of the hardware electronics. Therefore, there is a need for a layered approach to combat hardware electronics attacks by untrusted third-party entities using complementary security insertion tools to protect the hardware electronics in untrusted environments during development, fabrication, and/or assembly of the hardware electronics.

In this regard, System-on-Chip (SoC) architectures generally integrate third-party semiconductor cores such as, for example, hardware Intellectual Property (IP) cores that coordinate and/or communicate through a Network-on-Chip (NoC) fabric to provide various types of system functionality. As mentioned above, communication of IP cores through the NoC fabric often introduces security vulnerabilities for the SoC. Accordingly, NoCs in SoC architectures are often vulnerable to snooping, reverse-engineering, Trojan attacks, and/or other security vulnerabilities.

Hardware obfuscation is a technique to protect hardware IP cores against piracy attacks and/or other security vulnerabilities. Traditional obfuscation techniques generally rely on preventing an attacker from black-box usage of a hardware IP core and/or understanding a design-intent of a hardware IP core, thereby preventing an unauthorized third-party from gaining access to the hardware IP core or replicating a design of the hardware IP core. However, traditional obfuscation techniques are generally implemented at the IP Level. For example, certain obfuscation techniques (e.g., a functional obfuscation technique, etc.) are applied to an early stage of a life cycle of a hardware IP core. Alternatively, other traditional obfuscation techniques (e.g., a physical obfuscation technique, etc.) are applied in a fabrication stage of a hardware IP core. Other traditional obfuscation techniques such as, for example, state space obfuscation techniques, add locking logic circuits at strategic locations of a combinational block to obfuscate a finite state machine of a design. However, traditional obfuscation techniques are still vulnerable to piracy attacks and/or other security vulnerabilities due to, for example, the deterministic techniques being identified and/or bypassed by an attacker.

Authenticated encryption is another technique to protect hardware IP cores against piracy attacks and/or other security vulnerabilities. For example, authenticated encryption techniques for NoC security provide encryption-decryption of data packets emanating out of an IP core in the SoC. Other techniques such as bit shuffling, heuristic-based fault detection models, and/or route randomization can alternatively be employed to protect hardware IP cores against piracy attacks and/or other security vulnerabilities. However, these traditional techniques to protect hardware IP cores against piracy attacks and/or other security vulnerabilities primarily focus on security vulnerabilities related to data integrity, denial of service, and/or side/covert channel attacks.

To address these and/or other issues, various embodiments described herein relate to a novel multi-layered framework for security of integrated circuits. The multi-layered framework can include obfuscation, algebraic transformation, structural artifact removal, and/or interconnect structure transformation for security of integrated circuits. In various embodiments, an integrated circuit can be a structured application specific integrated circuit (ASIC). The multi-layered framework can be configured to provide a low-cost hardware IP protection scheme. In various embodiments, the multi-layered framework can employ a layered approach in which a countermeasure rectifies a shortcoming of one or more other countermeasures to provide improved security for integrated circuits. In various embodiments, unused resources in configurable logic blocks can be utilized to minimize overhead costs for providing the improved security for integrated circuits.

In various embodiments, the multi-layered framework protects hardware IP cores against confidentiality and/or integrity attacks. For example, the multi-layered framework can provide robust and multi-layered security against reverse engineering, piracy, an/or malicious modifications to an integrated circuit design flow. In various embodiments, a combination of multiple countermeasures can be employed over two abstraction levels to provide improved security for hardware IP cores. In various embodiments, an NoC routing table configuration can be employed as a pre-synthesis countermeasure that modifies interconnects of a design in a Register Transfer Level (RTL) source code for a hardware IP core. The NoC routing table configuration can be a countermeasure where NoC router interconnects between various IP cores in a SoC design are obfuscated using programmable multiplexers to prevent potential snooping and/or other system-level attacks on the SoC.

During post-synthesis, both a combinational space and a state space of the designs for the hardware IP core can be transformed using Boolean Algebraic Transformation and State Space Obfuscation. Boolean Algebraic Transformation (BAT) can remove one or more portions of an original design functionality of the hardware IP core and/or can transform one or more portions of the combinational logic. For example, a BAT can strip original design functionality of an integrated circuit when the design is obfuscated and/or can restore the functionality only when the correct key is applied. State Space Transformation (SST) can protect the sequential logic in the original design of the hardware IP core. For example, an SST can obfuscate an original state space of the design by adding an authentication finite state machine (FSM). The true functionality of the design is restored only upon applying a sequence of key patterns over several clock cycles. In various embodiments, along with these countermeasures, a Lookup Table Configuration (LUTC) can be employed to remove one or more structural artifacts from the previous countermeasures and/or to replace the one or more structural artifacts with programmable logic. For example, a LUTC can be provided to prevent one or more structural signatures introduced into a design by the BAT and SST countermeasures. In various embodiments, a LUTC can insert look-up tables (LUTs) at strategic places in the hardware, resulting in structural and/or functional transformations that hide the structural signatures from untrusted third-party entities.

As such, four design transformations, or another combination thereof, can be employed (1) NoC routing table configuration for interconnect structure transformation, (2) SST, (3) BAT of logic functions, and (4) LUTC for structural artifact removal. The individual transformations can be integrated in a way that enforces effectiveness of the other transformations and can remove respective attack surfaces. For example, SST can remove the "static key" of BAT and LUTC can eliminate the possibility of structural analysis attacks for both BAT and SST. In various embodiments, BAT can be configured to protect combinational logic components of a hardware IP core, SST can be configured to protect the state-space of sequential logic of a hardware IP core, the NoC routing table configuration can be configured to protect interconnects of a hardware IP core, and LUTC can be configured to protect sequential and/or combinational logic of a hardware IP core. In various embodiments, LUTC can be applied on the output of the combination of BAT and SST steps to remove any artifacts from the locked design and/or to increase the complexity of any structural attack. In various embodiments, LUTC can be employed to provide more robust combinational and/or sequential logic locking for a hardware IP core. LUTC can additionally be applied on an original design of a hardware IP core to introduce limited FPGA-like programmability into the design and/or to hide critical logic.

By combining the pre-synthesis and post-synthesis countermeasures, any hardware IP core can be protected against both functional attacks and structural attacks. It is to be appreciated that the layered approach disclosed herein can be employed for any structured ASIC where unused resources in configurable logic blocks are utilized to minimize overhead costs. Accordingly, the multi-layered approach disclosed herein can protect hardware IP cores against piracy, reverse engineering, and/or exfiltration of design secrets. The multi-layered approach disclosed herein can also provide an extremely robust, low-cost countermeasure tailored to the many use cases, including structured ASIC technology. In various embodiments, unused resources for a design and/or embedded block memory can be employed to minimize design overhead due to respective countermeasures. For example, unused resources in the structured ASIC can be employed for implementing the BAT and SST, registered files can be employed for LUT configuration, and/or embedded block random access memory (RAM) can be employed for implementing NoC routing tables in a structured ASIC.

As disclosed herein, the term 'obfuscation' may be used interchangeably to represent electronic hardware obfuscation or logic locking techniques.

Additionally, as disclosed herein, RTL source code can model an integrated circuit (e.g., an SoC, a semiconductor core, etc.) based on flow of signals between hardware components and/or logical operations associated with the signals. For example, a hardware description language can be employed to implement RTL source code, which provides a high-level description of an integrated circuit.

A. EXEMPLARY SECURITY COUNTERMEASURES IN A HARDWARE DESIGN PROCESS

FIG. 1 illustrates a hardware design process 100 associated with security countermeasures according to one or more embodiments of the present disclosure. In various embodiments, the hardware design process 100 employs obfuscation, algebraic transformation, structural artifact removal, and/or interconnect structure transformation for security of a hardware IP core. In various embodiments, the hardware design process 100 can include a transformation process 102 associated with a layered hardware core IP protection scheme with four security insertion tools to provide a combined protective solution for a hardware IP core 104. The transformation process 102 can be a security insertion process for the hardware IP core 104. In an embodiment, the hardware IP core 104 can be an SoC that includes one or more processors, memory, cryptography circuitry, and/or communication circuitry. Additionally, the one or more processors, memory, cryptography circuitry, and/or communication circuitry can be communicatively coupled via respective network interfaces and/or a set of routers.

In one or more embodiments, the transformation process 102 includes NoC routing table configuration 106, a state space transformation 108, an algebraic transformation 110, and/or a LUT configuration 112. In various embodiments, the algebraic transformation 110 is a Boolean algebraic transformation. The NoC routing table configuration 106, the state space transformation 108, the algebraic transformation 110, and/or the LUT configuration 112 can be employed as a combined countermeasure to protect a design of the hardware IP core 104. In various embodiments, each of the individual countermeasures of the transformation process 102 (e.g., the NoC routing table configuration 106, the state space transformation 108, the algebraic transformation 110, and/or the LUT configuration 112) can enforce and/or complement the security of other countermeasures by eliminating attack surfaces. Accordingly, a highly attack-resistant countermeasure to protect a design of the hardware IP core 104 can be provided via the transformation process 102.

The transformation process 102 can receive input 101. The input 101 can include one or more design files, one or more security targets, and/or one or more design constraints for the hardware IP core 104. In one or more embodiments, the input 101 can include an RTL source code that model a design of the hardware IP core 104 via a hardware description language. In various embodiments, the NoC routing table configuration 106, the state space transformation 108, the algebraic transformation 110, and/or the LUT configuration 112 can be utilized to provide an attack-resistant obfuscated version of the hardware IP core 104 based on the input 101. For example, the NoC routing table configuration 106, the state space transformation 108, the algebraic transformation 110, and/or the LUT configuration 112 can provide one or more transformations to the input 101 (e.g., the RTL source code) to provide output 103. The output 103 can include a transformed version of the one or more design files for the hardware IP core 104. In one or more embodiments, the output 103 can include a transformed RTL source code for the hardware IP core 104.

In various embodiments, with the NoC routing table configuration 106, one or more NoC routing tables can be removed from the RTL source code. The one or more NoC routing tables can also be replaced with programmable memory such as, for example, one or more lookup tables. In various embodiments, the NoC routing table configuration 106 can be configured to obscure inter-IP communication of a design of the hardware IP core 104 and the protection of the inter-IP communication can be further enhanced via the state space transformation 108, the algebraic transformation 110, and/or the LUT configuration 112. For example, the NoC routing table configuration 106 can transform one or more portions of the RTL source code to obscure the inter-IP communication.

The state space transformation 108 can be configured to protect the hardware IP core 104 from SAT attacks, probing attacks, and/or ATPG based attacks. In various embodiments, the state space transformation 108 can remove one or more static keys for transformation by adding one or more finite state machines and/or extra logic into the design of the hardware IP core 104. In various embodiments, to unlock a design that has been locked by the state space transformation 108, an attacker would be required to apply the key in a particular sequence. Thus, even if an attacker applies the correct key during a brute-force attack, the design will not unlock since the sequence in which the key is applied is not correct.

The algebraic transformation 110 can perform structural obfuscation and functional obfuscation of the combinational logic in the design of the hardware IP core 104. In various embodiments, the algebraic transformation 110 can prevent structural attacks and/or Automatic Test Pattern Generation (ATPG) based attacks by identifying and stripping non-critical logic cones from the design of the hardware IP core 104. In various embodiments, the algebraic transformation 110 can partition a design of the hardware IP core 104. The algebraic transformation 110 can additionally apply a structural transformation to respective partitions. In various embodiments, the algebraic transformation 110 can be applied to combinational logic space of the design of the hardware IP core 104. Additionally or alternatively, in certain embodiments, one or more portions of the state space transformation 108 can be updated based on the algebraic transformation 110

The LUT configuration 112 can be configured to further prevent the transformed design of the hardware IP core 104 from structural attacks. In various embodiments, the LUT configuration 112 can remove any structural signature of the transformations that may be present as a result of applying the NoC routing table configuration 106, the state space transformation 108, and/or the algebraic transformation 110 to the design of the hardware IP core 104. In various embodiments, the LUT configuration 112 can replace the structural signatures with respective LUTs.

In various embodiments, the NoC routing table configuration 106, the state space transformation 108, the algebraic transformation 110, and/or the LUT configuration 112 can be sequentially applied one after another to form an integrated countermeasure which provides improved attack resistance for the hardware IP core 104. The NoC routing table configuration 106, the state space transformation 108, the algebraic transformation 110, and/or the LUT configuration 112 can also be configured to target different aspects of protection and/or functionality of the hardware IP core 104. In certain embodiments, one or more security targets and/or one or more design constraints for the hardware IP core 104 (e.g., as a result of the NoC routing table configuration 106, the state space transformation 108, the algebraic transformation 110, and/or the LUT configuration 112) can be compared to one or more security measures 113 for the hardware IP core 104. The one or more security measures 113 can be one or more predefined security targets and/or design constraints to achieve a certain degree of security for the hardware IP core 104. In response to a determination that the one or more security targets and/or one or more design constraints for the hardware IP core 104 satisfy the one or more security measures 113, the transformation process 102 can provide the output 103. However, in response to a determination that the one or more security targets and/or one or more design constraints for the hardware IP core 104 do not satisfy the one or more security measures 113, the transformation process 102 can repeat the NoC routing table configuration 106, the state space transformation 108, the algebraic transformation 110, and/or the LUT configuration 112 until the one or more security targets and/or one or more design constraints for the hardware IP core 104 satisfy the one or more security measures 113.

B. EXEMPLARY SECURITY COUNTERMEASURES FOR A HARDWARE IP CORE

FIG. 2 illustrates a system 200 associated with security countermeasures according to one or more embodiments of the present disclosure. The system 200 includes an exemplary embodiment of the hardware IP core 104. In various embodiments, the hardware IP core 104 can include one or more processors 202, memory 204, cryptography circuitry 206, and/or communication circuitry 208. In various embodiments, the one or more processors 202, memory 204, cryptography circuitry 206, and/or communication circuitry 208 can include respective network interfaces 210. Additionally, the one or more processors 202, memory 204, cryptography circuitry 206, and/or communication circuitry 208 can be communicatively coupled via one or more routers 212. The cryptography circuitry 206 can be configured to execute and/or provide one or more cryptographic protocols and/or one or more cryptography algorithms for the hardware IP core 104.

In various embodiments, the NoC routing table configuration 106 can be configured to remove and/or replace one or more portions of the one or more routers 212 to provide protection for the hardware IP core 104. Additionally or alternatively, the state space transformation 108 can be configured to transform one or more portions of a control path 214 of the cryptography circuitry 206 to further provide protection for the hardware IP core 104. Additionally or alternatively, the algebraic transformation 110 can be configured to transform one or more portions of the control path 214, a data path 216, and/or interface logic 218 of the cryptography circuitry 206 to further provide protection for the hardware IP core 104. Additionally or alternatively, the LUT configuration 112 can be configured to remove and/or replace one or more portions of the control path 214, the data path 216, and/or the interface logic 218 of the cryptography circuitry 206 to further provide protection for the hardware IP core 104. In various embodiments, the data path 216 can be hardware configured to perform one or more operations related to memory, registers, adders, logic units, and/or communication busses for the hardware IP core 104. The control path 214 can be hardware configured to control the data path 216 via one or more control signals related to selection and/or switching of the operations. The interface logic 218 can be hardware configured to interface the control path 214 and the data path 216.

In various embodiments, the NoC routing table configuration 106 enables systematic transformation of router ports in the interconnect with programmable multiplexers. The NoC routing table configuration 106 can provide system level obfuscation, ensuring safety and security of on-chip components. In various embodiments, the NoC routing table configuration 106 can utilize SoC RTL with the underlying NoC topology as the input and can provides a transformed version of the design. The router IOs can be secured using a multiplexer-demultiplexer interface. The multiplexer interfaces can be configured to realize a variety of topologies after fabrication by programming a specific set of state elements, only one of which corresponds to the original topology of the fabric. The switch configuration can correspond to the original topology as the activation package. The transformed design can be functionally equivalent to the original design only under the condition that the correct configuration to the multiplexer structures, the activation package, is provided. In various embodiments, the NoC routing table configuration 106 can utilize a collection of multiplexers controlled by programmable registers.

In various embodiments, finite state machines in the original design can act as the control logic in the design. State space can be represented by a set of reachable states of the flip-flops in the control path of the design. These control path flip-flops can correspond to state elements which make up the finite state machines in the original design. In various embodiments, the state space transformation 108 can be utilized to transform a state space of the design. The state space transformation 108 can protect the hardware IP core 104 from reverse-engineering, piracy, and/or malicious modifications by locking the design at the finite state machine level of abstraction before it is transferred to a foundry or design facility for fabrication. In various embodiments, the state space transformation 108 can transform and locks the embedded finite state machine of a design. In various embodiments, the existing design flip-flop can be utilized in parallel to the original design logic at the input of a target state space flip-flop. In various embodiments, the state space transformation 108 can add next state logic of a non-linear feedback shift register using a multiplexer such that a finite state machine can operate a normal mode (e.g., an original finite state machine mode) or an obfuscated mode (e.g., a non-linear feedback shift register mode) based on the application of the key values. In various embodiments, the state space transformation 108 can lock the design by transforming both the combinational and state space of the design.

In various embodiments, the algebraic transformation 110 protects the hardware IP core 104 against threats from various untrusted entities by selectively stripping the functionality of arbitrary parts of the combinational logic in the design. The stripped logic can be replaced with gates driven by additional ports (e.g., key inputs) that can control and corrupt functionality of the hardware IP core 104. In various embodiments, when the correct key is applied to the protected design via the key inputs, the design output can resemble the true functionality of the original design. However, if the key applied is incorrect, an input pattern exists that will result in corrupted outputs. More specifically, the algebraic transformation 110 can remove a point function of the original design and restore the stripped function when applied with the correct key.

In various embodiments, the LUT configuration 112 can remove logic gates or a combination of logic gates at strategic locations in the RTL source code to prevent identification of the logic gates. In various embodiments, the LUT configuration 112 can identify candidate logic blocks from the transformed design that have structural signatures using a combination of structural parameters. The structural parameters can include, but is not limited to, fan-in parameters, fan-out parameters, type of gate, gates in the neighborhood, the activity of a wire parameters, the signal probability of a wire, and/or one or more other structural parameters. In various embodiments, the LUT configuration 112 can remove one or more structural signatures and replace the structures signatures with LUTs. In various embodiments, the LUT configuration 112 can perform structural modifications via a LUT-based logic obfuscation. In various embodiments, the LUT configuration 112 can provide a design for the hardware IP core 104 that is more resilient and less susceptible to reverse engineering, structural-based attacks, and/or functional analysis-based attacks, thus improving the overall security of the hardware IP core 104.

FIG. 3 illustrates a transformation process 300 associated with security countermeasures according to one or more embodiments of the present disclosure. In one or more embodiments, the transformation process 300 corresponds to the transformation process 102. In one or more embodiments, the transformation process 300 includes a step 306 associated with the NoC routing table configuration 106, a step 308 associated with the state space transformation 108, a step 310 associated with the algebraic transformation 110, and/or a step 312 associated with the LUT configuration 112. In various embodiments, the step 306 is configured to remove one or more NoC routing tables from a design of the hardware IP core 104 and/or to replace removed NoC routing tables with respective programmable memory. In various embodiments, the step 308 is configured to transform a state space of embedded state machines related to a design of the hardware IP core 104. In various embodiments, the step 310 is configured to transform combination logic related to a design of the hardware IP core 104. In various embodiments, the step 312 is configured to remove security critical logic from a design of the hardware IP core 104 and/or to replace the removed security critical logic with respective LUTs.

In various embodiments, hypergraphs can be employed to generate a graphical representation of a hardware netlist, where each vertex is a gate (e.g., a combinational gate or a sequential gate) and edges are nets connected to these gates. Any information regarding design components can be extracted from the hypergraph structure and graph-based algorithms can be applied to the hypergraph for analyzing the design. Moreover, hypergraphs can provide an alternate form of visualization for a design of a hardware IP core. In various embodiments, combinational logic of a design of a hardware IP core can be mapped into a Boolean network consisting of logic gates (e.g., AND gates, OR gates, INV gates, NOT gates, etc.) via synthesis. In various embodiments, basic gates can be employed to realize an original design logic and/or to enable a more robust design transformation since logic previously hidden inside larger gates can become accessible.

Figure 4:
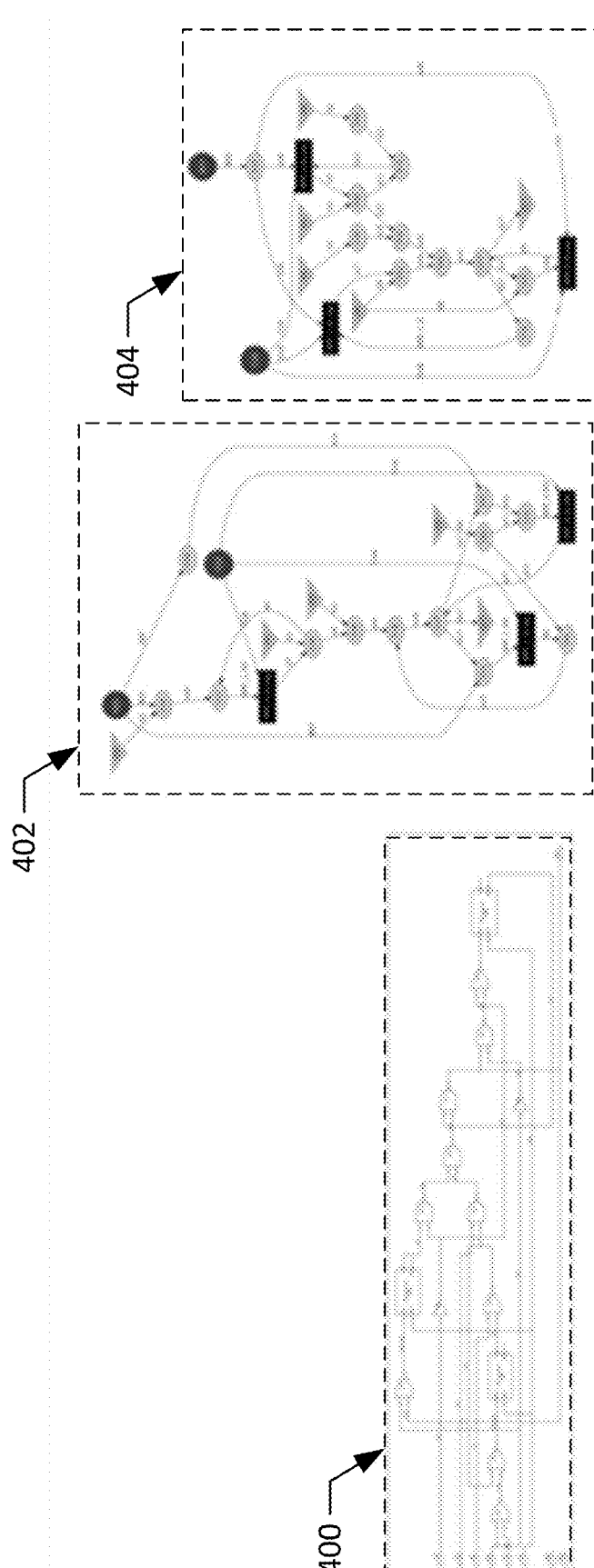
FIG. 4 illustrates an exemplary hypergraph generation, according to one or more embodiments of the present disclosure.

FIG. 4 illustrates example hypergraph generation according to one or more embodiments of the present disclosure. FIG. 4 includes an original hardware IP core 400, a gate-level hypergraph 402 for the original hardware IP core 400, and a corresponding AND-OR-INV Graph (AOIG) 404 for the original hardware IP core 400. In various embodiments, the gate-level hypergraph 402 includes flip-flops (configured as one or more nodes of the hypergraph 402) and combinational gates (configured as one or more nodes of the hypergraph 402). In various embodiments, the AOIG 404 includes AND gates, OR gates, and INV gates employed for combinational logic.

C. EXEMPLARY REMOVAL OF NOC ROUTING TABLES AND REPLACEMENT WITH PROGRAMMABLE MEMORY

Figure 5:
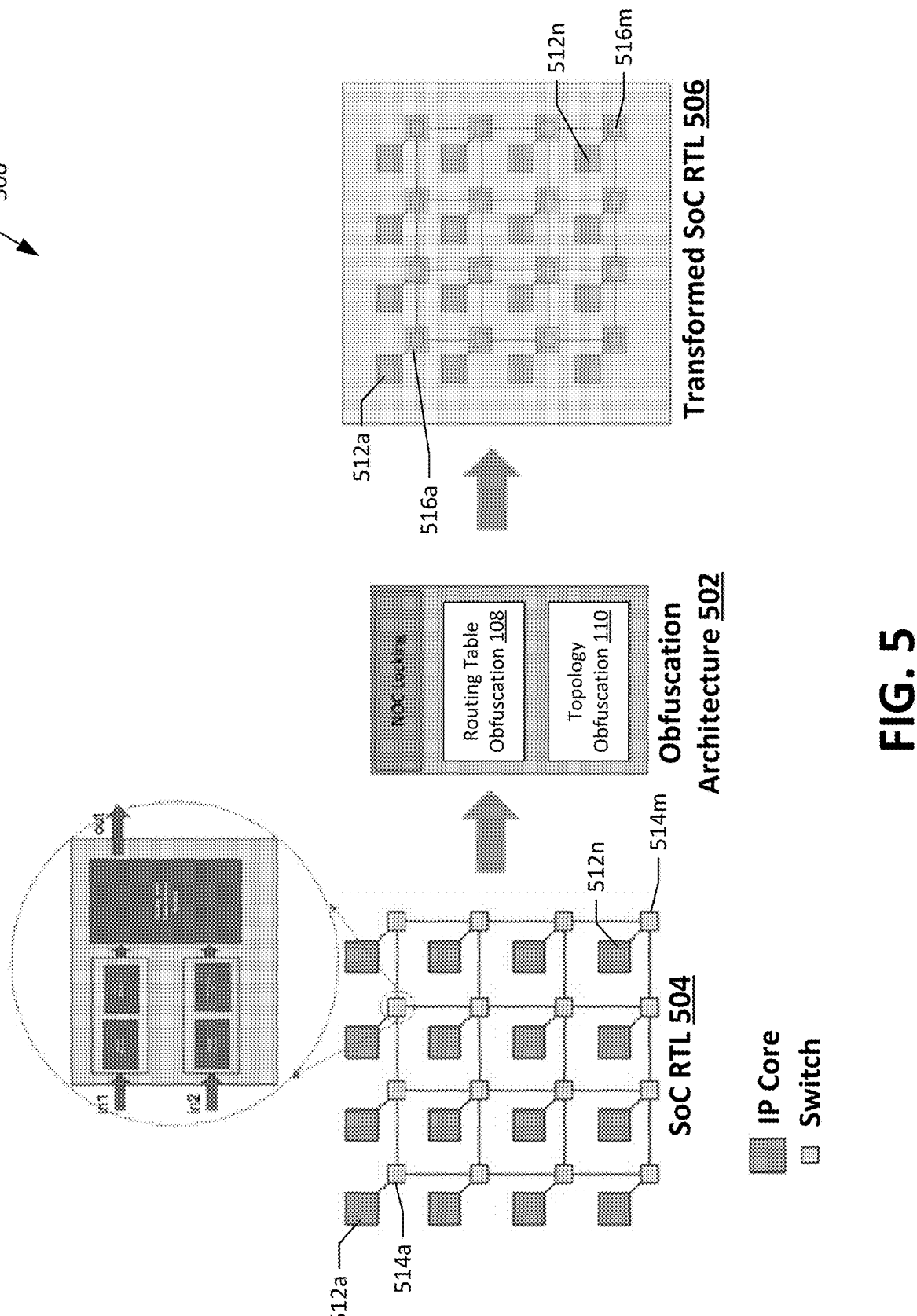
FIG. 5 illustrates an exemplary system associated with Network-on-Chip (NoC) routing table configuration, according to one or more embodiments of the present disclosure.

FIG. 5 illustrates example system 500 associated with NoC routing table configuration according to one or more embodiments of the present disclosure. In various embodiments, the system 500 mitigates NoC attacks by introducing a collection of novel obfuscation mechanisms that specifically target the routers and the fabric topologies. In various embodiments, the system 500 replaces static routing tables with LUTs. In various embodiments, the system 500 additionally or alternatively replaces static fabric connections with programmable switches. In various embodiments, an SoC RTL with an integrated NoC can be employed to generate an obfuscated SoC with the network topology and routing tables obfuscated. In various embodiments, the system 500 can provide a transformed SoC RTL such that the inter-IP communications cannot be derived from the SoC design without access to the LUT and switch configurations. In various embodiments, the system 500 provides NoC routing table configuration via an RTL-RTL transformation. In various embodiments, a locking tool can include an integrated NoC simulation framework. In various embodiments, a transformed SoC RTL (e.g., an obfuscated SoC RTL) can be provided to a structured ASIC flow for synthesis and/or optimization.

In one or more embodiments, the system 500 includes an obfuscation architecture 502 that transforms an SoC RTL 504 into a transformed SoC RTL 506. In various embodiments, the SoC RTL 504 corresponds to a design (e.g., an original design) of the hardware IP core 104. The obfuscation architecture 502 can transform the SoC RTL 504 into the transformed SoC RTL 506 via one or more obfuscation processes. The SoC RTL 504 can be an RTL source code that models an SoC based on flow of signals between hardware components and/or logical operations associated with the signals. For example, the SoC RTL 504 can be configured as a hardware description language that provides a high-level description of the SoC. The SoC can be an integrated circuit that includes one or more IP cores 512a-n and/or one or more switches 514a-m. Accordingly, in various embodiments, the SoC RTL 504 can be configured to describe the one or more IP cores 512a-n and/or the one or more switches 514a-m. However, it is to be appreciated that, in certain embodiments, the SoC RTL 504 can be an RTL source code that models a different type of hardware such as, for example, a semiconductor core or another type of integrated circuit. The one or more switches 514a-m can be respectively configured for routing and/or transmission control for data associated with the one or more IP cores 512a-n. In various embodiments, the one or more switches 514a-m can be respectively configured to receive data provided by an IP core from the one or more IP cores 512a-n and/or at least one switch from the one or more switches 514a-m. The one or more switches 514a-m can also be respectively configured to provide data to one or more other switches from the one or more switches 514a-m.

In one or more embodiments, the obfuscation architecture 502 can transform the SoC RTL 504 into the transformed SoC RTL 506 via routing table obfuscation 508 and/or topology obfuscation 510. The routing table obfuscation 508 can be configured for routing table obfuscation. In one or more embodiments, the routing table obfuscation 508 can be configured to replace one or more static NoC routing tables related to the SoC RTL 504 with one or more configurable logic tables. In various embodiments, the routing table obfuscation 508 can be configured to replace routing logic for the SoC RTL 504 with respective configurable tables. For example, the routing table obfuscation 508 can replace routing table metadata for the SoC RTL 504 with configurable table entries that can be configured (e.g., burnt) into configurable tables by a designer post manufacturing of the SoC. Configurable parameters for the routing (e.g., configuration parameters for the configurable tables) can be configured such that routing occurs through (e.g., routing occurs only through) configuration provided by the configurable parameters. Accordingly, a foundry and/or other manufacturer for the SoC can be provided with an empty structure for the routing logic to prevent a malicious third-party actor oblivious to the underlying routing logic for the SoC.

The topology obfuscation 510 can be configured for topology obfuscation. In one or more embodiments, the topology obfuscation 510 can be configured to replace static fabric connections related to the SoC RTL 504 with a combination of programmable multiplexers. In various embodiments, the topology obfuscation 510 can provide system-level design transformation with respect to the SoC RTL 504.

The transformed SoC RTL 506 can be a transformed RTL source code that models the SoC. For example, the SoC RTL 504 can be configured as a transformed hardware description language that provides a transformed description of the SoC. In various embodiments, the transformed SoC RTL 506 can be configured to describe the one or more IP cores 512a-n and/or one or more transformed switches 516a-m. The one or more transformed switches 516a-m can be obfuscated versions of the one or more switches 514a-m.

D. EXEMPLARY TRANSFORMATION OF A STATE SPACE

Figure 6:
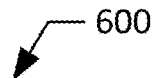
FIG. 6 illustrates an exemplary countermeasure process associated with transformation of a state space, according to one or more embodiments of the present disclosure.

FIG. 6 illustrates an example countermeasure process 600 associated with state space transformation 108 according to one or more embodiments of the present disclosure. In various embodiments, the countermeasure process 600 is configured to transform the state space of a design of the hardware IP core 104. In various embodiments, the countermeasure process 600 can include a step 602 to perform initial synthesis based on a configuration file 601 and/or an input design 603, a step 604 to generate a hypergraph related to the input design 603, a step 606 to identify state elements in the input design 603, a step 608 to create obfuscation FSMs for the input design 603 to validate a key 605, a step 610 to merge OFSMs with the original design, and/or a step 612 to perform a final constrained synthesis that provides a transformed design 607 for the hardware IP core 104. In various embodiments, the input design 603 can correspond to at least a portion (e.g., RTL source code) of the input 101.

In various embodiments, the countermeasure process 600 is configured to protect the hardware IP core 104 from reverse-engineering, piracy, and/or malicious modifications by locking the design at a finite state machine level of abstraction before the design of the hardware IP core 104 is employed by a fabrication process (e.g., by an untrusted foundry or design facility). In various embodiments, the countermeasure process 600 can transform and/or lock one or more embedded finite state machine of a design of the hardware IP core 104. Our state space obfuscation approach for gate-level IP blocks is scalable and can quantify the level of security of the obfuscated design. The proposed methodology applies to any sequential design and locks the design by transforming both the combinational and state space of the design. In various embodiments, the countermeasure process 600 can perform a secret key-based obfuscation of the design of the hardware IP core 104. Accordingly, an original functionality of the hardware IP core 104 can be unlocked only when a correct sequence of key vectors is applied through input ports of the hardware IP core 104. In various embodiments, the countermeasure process 600 can be performed over multiple clock cycles. Additionally, key validation can be executed using one or more obfuscation finite state machines inserted into the design of the hardware IP core 104. For example, the one or more obfuscation finite state machines can be employed to obfuscate functionality of the design of the hardware IP core 104. In various embodiments, the countermeasure process 600 can insert one or more flip-flops into the design of the hardware IP core 104 to increase a state space of the design and/or to increase difficulty of reverse engineering the obfuscated design of the hardware IP core 104. Additionally, key validation via multiple obfuscation finite state machines can increase complexity of black-box attacks against the hardware IP core 104.

E. EXEMPLARY TRANSFORMATION OF COMBINATIONAL LOGIC

Figure 7:
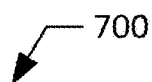
FIG. 7 illustrates an exemplary countermeasure process associated with transformation of combinational logic, according to one or more embodiments of the present disclosure.

FIG. 7 illustrates an example countermeasure process 700 associated with the algebraic transformation 110 according to one or more embodiments of the present disclosure. In various embodiments, the countermeasure process 700 employs a Boolean Algebraic Transformation (BAT). In various embodiments, the countermeasure process 700 protects a design of the hardware IP core 104 by selectively removing functionality of arbitrary parts of combinational logic within a design of the hardware IP core 104 using a logic locking mechanism. In various embodiments, the countermeasure process 700 can include a step 702 to perform initial synthesis based on a configuration file 701 and/or an input design 703, a step 704 to generate a hypergraph related to the input design 703, a step 706 to determine critical and non-critical logic cones in the input design 703, a step 708 to strip functionality of a non-critical logic cone in the input design 703 and to generate a key 705, a step 710 to partition a hypergraph related to the input design 703, a step 712 transform a truth table related to the input design 703, and/or a step 714 to perform a final constrained synthesis that provides a transformed design 707 for the hardware IP core 104. In various embodiments, the input design 703 can correspond to at least a portion (e.g., RTL source code) of the input 101.

In various embodiments, the countermeasure process 700 divides a design of the hardware IP core 104 into multiple partitions. Each partition can be obfuscated separately using a key-based Truth Table Transformation (T3) mechanism to improve protection of the design of the hardware IP core 104 against both structural attacks and functional attacks. For example, in various embodiments, the countermeasure process 700 can modify an original design of the hardware IP core 104 with a secret key to protect the original design against piracy attacks and/or reverse engineering attacks. In addition to the original inputs, a locked circuit provided by the countermeasure process 700 can include key inputs that are connected to on-chip tamper-proof memory bits. Accordingly, when an incorrect key is applied, the design produces incorrect outputs. However, when a correct key is applied, the design produces correct outputs.

In various embodiments a locking mechanism of the countermeasure process 700 modifies a netlist of the design such that the design implemented in hardware is different from the original design. In various embodiments, the countermeasure process 700 provides added protection logic without increasing the delay (e.g., without violating timing constraints for the hardware IP core 104). For example, the countermeasure process 700 can provide added protection logic such that an arrival time from the primary input to primary output is the same as the overall circuit delay. By employing an original RTL design (e.g., with the NoC routing table configuration) and constraint files as input files, critical logic cones, and/or non-critical logic cones can be determined based on the timing reports. Additionally, after analyzing a hypergraph, a non-critical cone can be selected and modified, and corresponding key-inputs can be inserted into the design. In various embodiments the hypergraph 402 or the AOIG 404 can be partitioned into smaller sub-graphs using a partitioning algorithm to provide high-quality localized partitions of equivalent sizes while also reducing a number of edges shared by the partitions. The size of each partition (e.g., a number of gates within each partition) can be determined from a total number of gates in the design and/or a target key size for the design. In various embodiments, each partition can be converted into standalone sub-modules of the original design in gate-level. In various embodiments, the edges and vertices of the sub-graph can be mapped to corresponding inputs, outputs, wires, and/or gates of the sub-modules. In various embodiments, each generated sub-module can be locked separately and/or merged together to restore the original design functionality of the hardware IP core 104.

In various embodiments, dummy signals from other partitions at the same logic depth can be added to a partition as dummy inputs. To combat attacks trying to extract the unlocking keys utilizing machine learning training sets, the countermeasure process 700 can maximize randomness in obfuscation by a transformation from a list of transformations including, but not limited to, shuffled outputs where output bits of the partition are randomly shuffled, an arithmetic operation where output of the partition is corrupted by randomly adding random arithmetic functions to existing Boolean logic in the partition and controlled by a key input, inverted outputs where outputs of the partition are selectively inverted, a dummy substitution where functionality of the partition is retained but inputs to the function are replaced with dummy inputs from other partitions, or a random function where the original functionality of the partition is replaced with random Boolean logic. In various embodiments, each partition can be genetically altered to modify a sub-graph of the partition and/or an entire AOIG of the design when, for example, the partitioned modules are merged and flattened using synthesis.

F. EXEMPLARY REMOVAL OF STRUCTURAL SIGNATURES AND REPLACEMENT WITH LUTS

Figure 8:
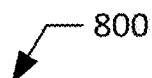
FIG. 8 illustrates an exemplary countermeasure process associated with removal of structural signatures and replacement with lookup tables (LUTs), according to one or more embodiments of the present disclosure.

FIG. 8 illustrates an example countermeasure process 800 associated with the LUT configuration 112 according to one or more embodiments of the present disclosure. For example, the countermeasure process 800 can be associated with removal of structural signatures and replacement with LUTs. In various embodiments, the countermeasure process 800 can include a step 802 to perform initial synthesis based on a configuration file 801 and/or an input design 803, a step 804 to generate a hypergraph related to the input design 803, a step 806 to identify structural signatures or critical logic in the input design 803, a step 808 to replace candidate logic blocks in the input design 803 with programmable LUTs and/or to generate a bitstream 805, and/or a step 810 to perform a final constrained synthesis that provides a transformed design 807 for the hardware IP core 104. In various embodiments, the input design 803 can correspond to at least a portion (e.g., RTL source code) of the input 101.

In various embodiments, the countermeasure process 800 can remove one or more structural signatures resulting from the countermeasure process 600 and/or the countermeasure process 700. In various embodiments, the countermeasure process 800 can replace the one or more structural signatures with one or more LUTs. For example, added logic (e.g., added gates and/or flip flops) from the countermeasure process 600 and/or the countermeasure process 700 can create identifiable structural signatures. For example, an adversary may explore nets that have very high or very low activities. As such, in certain embodiments, the countermeasure process 800 can be configured to remove one or more logic gates or combinations thereof at to prevent the identification of these gates.

Thus, in various embodiments, the countermeasure process 800 can be employed to further improve robustness of the countermeasure process 600 and/or the countermeasure process 700. In various embodiments, the countermeasure process 800 can identify candidate logic blocks from the transformed design that have structural signatures. In order to identify structural signatures, the countermeasure process 800 can consider a combination of structural parameters including, but not limit to, fan-in, fan-out, type of gate, gates in the neighborhood, the activity of a net (e.g., calculated based on random workload), and/or the signal probability of a net. As a result, the countermeasure process 800 can reduce susceptible to any reverse engineering or structural analysis-based attack as a result of the countermeasure process 600 and/or the countermeasure process 700.

In various embodiments, a feed-forward mechanism with respect to the NoC routing table configuration 106 can be employed by the countermeasure process 600, the countermeasure process 700, and/or the countermeasure process 800. For example, a design from the output (e.g., the transformed SoC RTL 506) of NoC routing table configuration 106 can be provided through a post-synthesis security insertion stage associated with the countermeasure process 600, the countermeasure process 700, and/or the countermeasure process 800. Accordingly, the countermeasure process 600, the countermeasure process 700, and/or the countermeasure process 800 can provide modifications to the original design (e.g., the SoC RLT 504) and the modifications can be synthesized, for example, using tool command language (TCL) scripts of a structured ASIC flow. In various embodiments, the countermeasure process 600, the countermeasure process 700, and/or the countermeasure process 800 can employ a feedback loop to further improve the countermeasure results for the hardware IP core 104. For example, after a fitter stage and/or a router stage associated with the countermeasure process 600, the countermeasure process 700, and/or the countermeasure process 800, performance, power, and/or other reports can be generated to determine whether further improvements to the countermeasure results are needed.

G. EXEMPLARY FLOWCHART FOR PROVIDING A MULTI-LAYERED FRAMEWORK FOR SECURITY OF INTEGRATED CIRCUITS

FIG. 9 illustrates a flowchart of a method 900 for providing a multi-layered framework for security of integrated circuits according to one or more embodiments of the present disclosure. In various embodiments, the method 900 provides an attack-resistant obfuscated SoC based on a transformed RTL source code. According to the illustrated embodiment, the method 900 includes a step 902 for removing one or more routing tables in a Register Transfer Level (RTL) source code that models a design for an SoC via a hardware description language, comprising replacing the one or more routing tables in the RTL source code with respective programmable memory. Additionally, the method 900 includes a step 904 for transforming a state space of one or more embedded state machines in the RTL source code. The method 900 additionally includes a step 906 for transforming one or more portions of combinational logic in the RTL source code. The method 900 additionally includes a step 908 for removing one or more portions of security-critical logic in the RTL source code, comprising replacing the one or more portions of security-critical logic in the RTL source code with respective lookup tables.

In certain embodiments, the providing the attack-resistant obfuscated SoC includes performing a multi-layered obfuscation technique by combining multiple countermeasures to transform the RTL source code.

In certain embodiments, the providing the attack-resistant obfuscated SoC includes improving security of respective countermeasures of a transformation process for the RTL source code by performing the multi-layered obfuscation technique.

In certain embodiments, the transforming the state space includes transforming a control path associated with the RTL source code.

In certain embodiments, the method 900 additionally or alternatively includes transforming a control path, a data path, and/or interface logic associated with the RTL source code based on an algebraic transformation.

In certain embodiments, the replacing the one or more portions of security-critical logic includes replacing one or more portions of a control path, a data path, and/or interface logic of the RTL source code with the respective lookup tables.

In certain embodiments, the providing the attack-resistant obfuscated SoC includes utilizing unused resources in configurable logic blocks of the RTL source code to minimize design overhead for the transformed RTL source code.

In certain embodiments, the providing the attack-resistant obfuscated SoC includes utilizing unused resources in configurable logic blocks of the RTL source code for implementing a Boolean Algebraic Transformation of the RTL source code.

In certain embodiments, the providing the attack-resistant obfuscated SoC includes utilizing unused resources in configurable logic blocks of the RTL source code for implementing a State Space Transformation of the RTL source code.

In certain embodiments, one or more steps (902, 904, 906, and/or 910) of the method 900 can be implemented in combination with one or more steps (902, 904, 906, and/or 910) of the method 900.

In an example embodiment, an apparatus for performing the method 900 of FIG. 9 above may include a processor configured to perform some or each of the operations (902, 904, 906, and/or 910) described above. The processor may, for example, be configured to perform the operations (902, 904, 906, and/or 910) by performing hardware implemented logical functions, executing stored instructions, or executing algorithms for performing each of the operations. Alternatively, the apparatus may comprise means for performing each of the operations described above. In this regard, according to an example embodiment, examples of means for performing operations 902, 904, 906, and/or 910 may comprise, for example, the processor and/or a device or circuit for executing instructions or executing an algorithm for processing information as described above. In various embodiments, an apparatus for performing the method 1400 may correspond to apparatus 1000 illustrated in FIG. 10.

H. EXEMPLARY TECHNICAL IMPLEMENTATION OF VARIOUS EMBODIMENTS

Embodiments of the present disclosure may be implemented in various ways, including as computer program products that comprise articles of manufacture. Such computer program products may include one or more software components including, for example, software objects, methods, data structures, and/or the like. A software component may be coded in any of a variety of programming languages. An illustrative programming language may be a lower-level programming language such as an assembly language associated with a particular hardware architecture and/or operating system platform. A software component comprising assembly language instructions may require conversion into executable machine code by an assembler prior to execution by the hardware architecture and/or platform. Another example programming language may be a higher-level programming language that may be portable across multiple architectures. A software component comprising higher-level programming language instructions may require conversion to an intermediate representation by an interpreter or a compiler prior to execution.

Other examples of programming languages include, but are not limited to, a macro language, a shell or command language, a job control language, a script language, a database query or search language, and/or a report writing language. In one or more example embodiments, a software component comprising instructions in one of the foregoing examples of programming languages may be executed directly by an operating system or other software component without having to be first transformed into another form. A software component may be stored as a file or other data storage construct. Software components of a similar type or functionally related may be stored together such as, for example, in a particular directory, folder, or library. Software components may be static (e.g., pre-established or fixed) or dynamic (e.g., created or modified at the time of execution).

A computer program product may include a non-transitory computer-readable storage medium storing applications, programs, program modules, scripts, source code, program code, object code, byte code, compiled code, interpreted code, machine code, executable instructions, and/or the like (also referred to herein as executable instructions, instructions for execution, computer program products, program code, and/or similar terms used herein interchangeably). Such non-transitory computer-readable storage media include all computer-readable media (including volatile and non-volatile media).

In one embodiment, a non-volatile computer-readable storage medium may include a floppy disk, flexible disk, hard disk, solid-state storage (SSS) (e.g., a solid state drive (SSD), solid state card (SSC), solid state module (SSM)), enterprise flash drive, magnetic tape, or any other non-transitory magnetic medium, and/or the like. A non-volatile computer-readable storage medium may also include a punch card, paper tape, optical mark sheet (or any other physical medium with patterns of holes or other optically recognizable indicia), compact disc read only memory (CD-ROM), compact disc-rewritable (CD-RW), digital versatile disc (DVD), Blu-ray disc (BD), any other non-transitory optical medium, and/or the like. Such a non-volatile computer-readable storage medium may also include read-only memory (ROM), programmable read-only memory (PROM), erasable programmable read-only memory (EPROM), electrically erasable programmable read-only memory (EEPROM), flash memory (e.g., Serial, NAND, NOR, and/or the like), multimedia memory cards (MMC), secure digital (SD) memory cards, SmartMedia cards, CompactFlash (CF) cards, Memory Sticks, and/or the like. Further, a non-volatile computer-readable storage medium may also include conductive-bridging random access memory (CBRAM), phase-change random access memory (PRAM), ferroelectric random-access memory (FeRAM), non-volatile random-access memory (NVRAM), magnetoresistive random-access memory (MRAM), resistive random-access memory (RRAM), Silicon-Oxide-Nitride-Oxide-Silicon memory (SONOS), floating junction gate random access memory (FJG RAM), Millipede memory, racetrack memory, and/or the like.

In one embodiment, a volatile computer-readable storage medium may include random access memory (RAM), dynamic random access memory (DRAM), static random access memory (SRAM), fast page mode dynamic random access memory (FPM DRAM), extended data-out dynamic random access memory (EDO DRAM), synchronous dynamic random access memory (SDRAM), double data rate synchronous dynamic random access memory (DDR SDRAM), double data rate type two synchronous dynamic random access memory (DDR2 SDRAM), double data rate type three synchronous dynamic random access memory (DDR3 SDRAM), Rambus dynamic random access memory (RDRAM), Twin Transistor RAM (TTRAM), Thyristor RAM (T-RAM), Zero-capacitor (Z-RAM), Rambus in-line memory module (RIMM), dual in-line memory module (DIMM), single in-line memory module (SIMM), video random access memory (VRAM), cache memory (including various levels), flash memory, register memory, and/or the like. It will be appreciated that where embodiments are described to use a computer-readable storage medium, other types of computer-readable storage media may be substituted for or used in addition to the computer-readable storage media described above.

As should be appreciated, various embodiments of the present disclosure may also be implemented as methods, apparatus, systems, computing devices, computing entities, and/or the like. As such, embodiments of the present disclosure may take the form of a data structure, apparatus, system, computing device, computing entity, and/or the like executing instructions stored on a computer-readable storage medium to perform certain steps or operations. Thus, embodiments of the present disclosure may also take the form of an entirely hardware embodiment, an entirely computer program product embodiment, and/or an embodiment that comprises a combination of computer program products and hardware performing certain steps or operations.

Embodiments of the present disclosure are described with reference to example operations, steps, processes, blocks, and/or the like. Thus, it should be understood that each operation, step, process, block, and/or the like may be implemented in the form of a computer program product, an entirely hardware embodiment, a combination of hardware and computer program products, and/or apparatus, systems, computing devices, computing entities, and/or the like carrying out instructions, operations, steps, and similar words used interchangeably (e.g., the executable instructions, instructions for execution, program code, and/or the like) on a computer-readable storage medium for execution. For example, retrieval, loading, and execution of code may be performed sequentially such that one instruction is retrieved, loaded, and executed at a time. In some exemplary embodiments, retrieval, loading, and/or execution may be performed in parallel such that multiple instructions are retrieved, loaded, and/or executed together. Thus, such embodiments can produce specifically configured machines performing the steps or operations specified in the block diagrams and flowchart illustrations. Accordingly, the block diagrams and flowchart illustrations support various combinations of embodiments for performing the specified instructions, operations, or steps.

Figure 10:
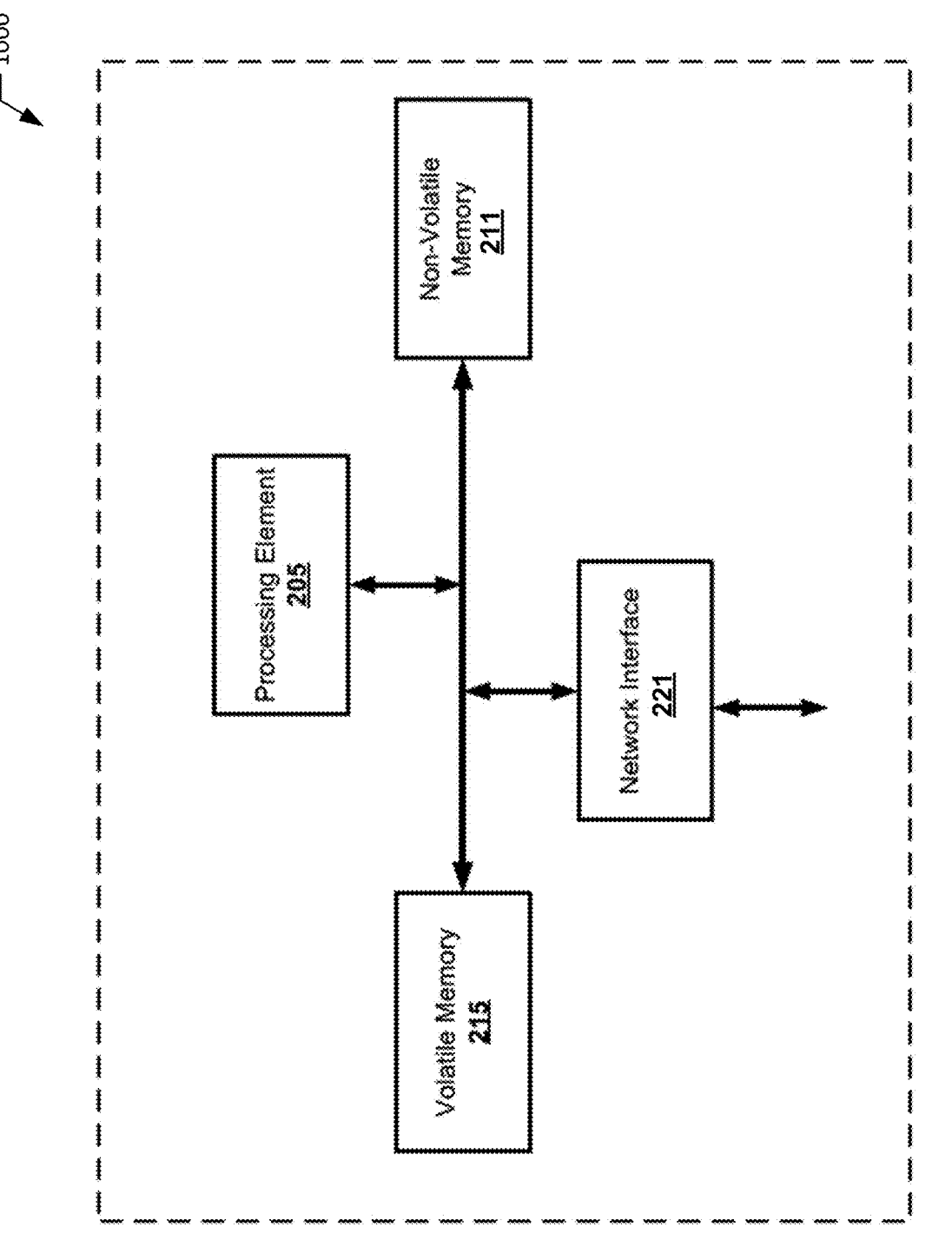
FIG. 10 illustrates a schematic of a computing entity that may be used in conjunction with one or more embodiments of the present disclosure.

FIG. 10 provides a schematic of an exemplary apparatus 1000 that may be used in accordance with various embodiments of the present disclosure. In particular, the apparatus 1000 may be configured to perform various example operations described herein to provide for obfuscation, algebraic transformation, structural artifact removal, and/or interconnect structure transformation for security of integrated circuits. In some example embodiments, the apparatus 1000 may be embodied by the hardware design process 100.

In general, the terms computing entity, entity, device, and/or similar words used herein interchangeably may refer to, for example, one or more computers, computing entities, desktop computers, mobile phones, tablets, phablets, notebooks, laptops, distributed systems, items/devices, terminals, servers or server networks, blades, gateways, switches, processing devices, processing entities, set-top boxes, relays, routers, network access points, base stations, the like, and/or any combination of devices or entities adapted to perform the functions, operations, and/or processes described herein. Such functions, operations, and/or processes may include, for example, transmitting, receiving, operating on, processing, displaying, storing, determining, creating/generating, monitoring, evaluating, comparing, and/or similar terms used herein interchangeably. In one embodiment, these functions, operations, and/or processes can be performed on data, content, information, and/or similar terms used herein interchangeably.

Although illustrated as a single computing entity, those of ordinary skill in the field should appreciate that the apparatus 1000 shown in FIG. 9 may be embodied as a plurality of computing entities, tools, and/or the like operating collectively to perform one or more processes, methods, and/or steps. As just one non-limiting example, the apparatus 1000 may comprise a plurality of individual data tools, each of which may perform specified tasks and/or processes.

Depending on the embodiment, the apparatus 1000 may include one or more network and/or communications interfaces 221 for communicating with various computing entities, such as by communicating data, content, information, and/or similar terms used herein interchangeably that can be transmitted, received, operated on, processed, displayed, stored, and/or the like. Thus, in certain embodiments, the apparatus 1000 may be configured to receive data from one or more data sources and/or devices, as well as receive data indicative of input, for example, from a device.

The networks used for communicating may include, but are not limited to, any one or a combination of different types of suitable communications networks such as, for example, cable networks, public networks (e.g., the Internet), private networks (e.g., frame-relay networks), wireless networks, cellular networks, telephone networks (e.g., a public switched telephone network), or any other suitable private and/or public networks. Further, the networks may have any suitable communication range associated therewith and may include, for example, global networks (e.g., the Internet), MANs, WANs, LANs, or PANs. In addition, the networks may include any type of medium over which network traffic may be carried including, but not limited to, coaxial cable, twisted-pair wire, optical fiber, a hybrid fiber coaxial (HFC) medium, microwave terrestrial transceivers, radio frequency communication mediums, satellite communication mediums, or any combination thereof, as well as a variety of network devices and computing platforms provided by network providers or other entities.

Accordingly, such communication may be executed using a wired data transmission protocol, such as fiber distributed data interface (FDDI), digital subscriber line (DSL), Ethernet, asynchronous transfer mode (ATM), frame relay, data over cable service interface specification (DOCSIS), or any other wired transmission protocol. Similarly, the apparatus 1000 may be configured to communicate via wireless external communication networks using any of a variety of protocols, such as general packet radio service (GPRS), Universal Mobile Telecommunications System (UMTS), Code Division Multiple Access 2000 (CDMA2000), CDMA2000 1× (1×RTT), Wideband Code Division Multiple Access (WCDMA), Global System for Mobile Communications (GSM), Enhanced Data rates for GSM Evolution (EDGE), Time Division-Synchronous Code Division Multiple Access (TD-SCDMA), Long Term Evolution (LTE), 5G New Radio (5G NR), Evolved Universal Terrestrial Radio Access Network (E-UTRAN), Evolution-Data Optimized (EVDO), High Speed Packet Access (HSPA), High-Speed Downlink Packet Access (HSDPA), IEEE 802.11 (Wi-Fi), Wi-Fi Direct, 802.16 (WiMAX), ultra-wideband (UWB), infrared (IR) protocols, near field communication (NFC) protocols, Wibree, Bluetooth protocols, wireless universal serial bus (USB) protocols, and/or any other wireless protocol. The apparatus 1000 may use such protocols and standards to communicate using Border Gateway Protocol (BGP), Dynamic Host Configuration Protocol (DHCP), Domain Name System (DNS), File Transfer Protocol (FTP), Hypertext Transfer Protocol (HTTP), HTTP over TLS/SSL/Secure, Internet Message Access Protocol (IMAP), Network Time Protocol (NTP), Simple Mail Transfer Protocol (SMTP), Telnet, Transport Layer Security (TLS), Secure Sockets Layer (SSL), Internet Protocol (IP), Transmission Control Protocol (TCP), User Datagram Protocol (UDP), Datagram Congestion Control Protocol (DCCP), Stream Control Transmission Protocol (SCTP), HyperText Markup Language (HTML), and/or the like.

In addition, in various embodiments, the apparatus 1000 includes or is in communication with one or more processing elements 205 (also referred to as processors, processing circuitry, and/or similar terms used herein interchangeably) that communicate with other elements within the apparatus 1000 via a bus, for example, or network connection. As will be understood, the processing element 205 may be embodied in several different ways. For example, the processing element 205 may be embodied as one or more complex programmable logic devices (CPLDs), microprocessors, multi-core processors, coprocessing entities, application-specific instruction-set processors (ASIPs), and/or controllers. Further, the processing element 205 may be embodied as one or more other processing devices or circuitry. The term circuitry may refer to an entirely hardware embodiment or a combination of hardware and computer program products. Thus, the processing element 205 may be embodied as integrated circuits, application specific integrated circuits (ASICs), field programmable gate arrays (FPGAs), programmable logic arrays (PLAs), hardware accelerators, other circuitry, and/or the like.

As will therefore be understood, the processing element 205 may be configured for a particular use or configured to execute instructions stored in volatile or non-volatile media or otherwise accessible to the processing element 205. As such, whether configured by hardware, computer program products, or a combination thereof, the processing element 205 may be capable of performing steps or operations according to embodiments of the present disclosure when configured accordingly.

In various embodiments, the apparatus 1000 may include or be in communication with non-volatile media (also referred to as non-volatile storage, memory, memory storage, memory circuitry, and/or similar terms used herein interchangeably). For instance, the non-volatile storage or memory may include one or more non-volatile storage or non-volatile memory media 211 such as hard disks, ROM, PROM, EPROM, EEPROM, flash memory, MMCs, SD memory cards, Memory Sticks, CBRAM, PRAM, FeRAM, RRAM, SONOS, racetrack memory, and/or the like. As will be recognized, the non-volatile storage or non-volatile memory media 211 may store files, databases, database instances, database management system entities, images, data, applications, programs, program modules, scripts, source code, object code, byte code, compiled code, interpreted code, machine code, executable instructions, and/or the like. The term database, database instance, database management system entity, and/or similar terms used herein interchangeably and in a general sense to refer to a structured or unstructured collection of information/data that is stored in a computer-readable storage medium.

In particular embodiments, the non-volatile memory media 211 may also be embodied as a data storage device or devices, as a separate database server or servers, or as a combination of data storage devices and separate database servers. Further, in some embodiments, the non-volatile memory media 211 may be embodied as a distributed repository such that some of the stored information/data is stored centrally in a location within the system and other information/data is stored in one or more remote locations. Alternatively, in some embodiments, the distributed repository may be distributed over a plurality of remote storage locations only. As already discussed, various embodiments contemplated herein use data storage in which some or all the information/data required for various embodiments of the disclosure may be stored.

In various embodiments, the apparatus 1000 may further include or be in communication with volatile media (also referred to as volatile storage, memory, memory storage, memory circuitry, and/or similar terms used herein interchangeably). For instance, the volatile storage or memory may also include one or more volatile storage or volatile memory media 215 as described above, such as RAM, DRAM, SRAM, FPM DRAM, EDO DRAM, SDRAM, DDR SDRAM, DDR2 SDRAM, DDR3 SDRAM, RDRAM, RIMM, DIMM, SIMM, VRAM, cache memory, register memory, and/or the like.

As will be recognized, the volatile storage or volatile memory media 215 may be used to store at least portions of the databases, database instances, database management system entities, data, images, applications, programs, program modules, scripts, source code, object code, byte code, compiled code, interpreted code, machine code, executable instructions, and/or the like being executed by, for example, the processing element 205. Thus, the databases, database instances, database management system entities, data, images, applications, programs, program modules, scripts, source code, object code, byte code, compiled code, interpreted code, machine code, executable instructions, and/or the like may be used to control certain aspects of the operation of the apparatus 1000 with the assistance of the processing element 205 and operating system.

As will be appreciated, one or more of the computing entity's components may be located remotely from other computing entity components, such as in a distributed system. Furthermore, one or more of the components may be aggregated, and additional components performing functions described herein may be included in the apparatus 1000. Thus, the apparatus 1000 can be adapted to accommodate a variety of needs and circumstances.

I. CONCLUSION

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Although specific terms are employed herein, they are used in a generic and descriptive sense only and not for purposes of limitation.

The invention claimed is:

1. A method for providing a multi-layered framework for security of integrated circuits, comprising:
   providing an attack-resistant obfuscated SoC based on a transformed RTL source code by:
     removing one or more routing tables in a Register Transfer Level (RTL) source code that models a design for an SoC via a hardware description language, comprising replacing the one or more routing tables in the RTL source code with respective programmable memory;

transforming a state space of one or more embedded state machines in the RTL source code;

transforming one or more portions of combinational logic in the RTL source code; and identifying a security-critical logic portion in the RTL source code that corresponds to a control path, a data path, or an interface logic for the SoC; and replacing the security-critical logic portion in the RTL source code with a lookup table (LUT) associated with LUT-based logic obfuscation to obfuscate the security-critical logic portion via the transformed RTL source code.

2. The method of claim 1, wherein the providing the attack-resistant obfuscated SoC comprises performing a multi-layered obfuscation technique by combining multiple countermeasures to transform the RTL source code.

3. The method of claim 2, wherein the providing the attack-resistant obfuscated SoC comprises improving security of respective countermeasures of a transformation process for the RTL source code by performing the multi-layered obfuscation technique.

4. The method of claim 1, wherein the transforming the state space comprises transforming a portion of the RTL source code that corresponds to the control path, the data path, or the interface logic.

5. The method of claim 1, further comprising:

transforming at least one of the control path, the data path, or interface logic associated with the RTL source code based on an algebraic transformation.

6. The method of claim 1, wherein the LUT comprises programmable logic for the control path, the data path, or the interface logic.

7. The method of claim 1, wherein the providing the attack-resistant obfuscated SoC comprises utilizing unused resources in configurable logic blocks of the RTL source code to minimize design overhead for the transformed RTL source code.

8. The method of claim 1, wherein the providing the attack-resistant obfuscated SoC comprises utilizing unused resources in configurable logic blocks of the RTL source code for implementing a Boolean Algebraic Transformation of the RTL source code.

9. The method of claim 1, wherein the providing the attack-resistant obfuscated SoC comprises utilizing unused resources in configurable logic blocks of the RTL source code for implementing a State Space Transformation of the RTL source code.

10. An apparatus comprising at least one processor and at least one memory including program code, the at least one memory and the program code configured to, with the at least one processor, cause the apparatus to at least:

remove one or more routing tables in a Register Transfer Level (RTL) source code that models a design for an SoC via a hardware description language, comprising replacing the one or more routing tables in the RTL source code with respective programmable memory;

transform a state space of one or more embedded state machines in the RTL source code;

transform one or more portions of combinational logic in the RTL source code; and identify a security-critical logic portion in the RTL source code that corresponds to a control path, a data path, or an interface logic for the SoC; and replace the security-critical logic portion in the RTL source code with a lookup table (LUT) associated with LUT-based logic obfuscation to obfuscate the security-critical logic portion via the transformed RTL source code.

11. The apparatus of claim 10, wherein the at least one memory and the program code are configured to, with the at least one processor, further cause the apparatus to at least:

perform a multi-layered obfuscation technique by combining multiple countermeasures to transform the RTL source code.

12. The apparatus of claim 11, wherein the at least one memory and the program code are configured to, with the at least one processor, further cause the apparatus to at least:

improve security of respective countermeasures of a transformation process for the RTL source code by performing the multi-layered obfuscation technique.

13. The apparatus of claim 10, wherein the at least one memory and the program code are configured to, with the at least one processor, further cause the apparatus to at least:

transform a portion of the RTL source code that corresponds to the control path, the data path, or the interface logic.

14. The apparatus of claim 10, wherein the at least one memory and the program code are configured to, with the at least one processor, further cause the apparatus to at least:

transform at least one of the control path, the data path, or interface logic associated with the RTL source code based on an algebraic transformation.

15. The apparatus of claim 10, wherein the LUT comprises programmable logic for the control path, the data path, or the interface logic.

16. A non-transitory computer storage medium comprising instructions, the instructions being configured to cause one or more processors to at least perform operations configured to:

remove one or more routing tables in a Register Transfer Level (RTL) source code that models a design for an SoC via a hardware description language, comprising replacing the one or more routing tables in the RTL source code with respective programmable memory;

transform a state space of one or more embedded state machines in the RTL source code;

transform one or more portions of combinational logic in the RTL source code; and identify a security-critical logic portion in the RTL source code that corresponds to a control path, a data path, or an interface logic for the SoC; and replace the security-critical logic portion in the RTL source code with a lookup table (LUT) associated with LUT-based logic obfuscation to obfuscate the security-critical logic portion via the transformed RTL source code.

17. The non-transitory computer storage medium of claim 16, wherein the operations are further configured to:

perform a multi-layered obfuscation technique by combining multiple countermeasures to transform the RTL source code.

18. The non-transitory computer storage medium of claim 16, wherein the operations are further configured to:

transform a portion of the RTL source code that corresponds to the control path, the data path, or the interface logic.

19. The non-transitory computer storage medium of claim 16, wherein the operations are further configured to:

transform at least one of the control path, the data path, or interface logic associated with the RTL source code based on an algebraic transformation.

20. The non-transitory computer storage medium of claim 16, wherein the LUT comprises programmable logic for the control path, the data path, or the interface logic.

* * * * *